United States Patent
Ohta (10) Patent No.: US 10,797,344 B2
(45) Date of Patent: Oct. 6, 2020

(54) METHOD FOR PRODUCING GARNET TYPE OXIDE SOLID ELECTROLYTE

(71) Applicant: TOYOTA JIDOSHA KABUSHIKI KAISHA, Toyota-shi, Aichi-ken (JP)

(72) Inventor: Shingo Ohta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 290 days.

(21) Appl. No.: 15/868,431

(22) Filed: Jan. 11, 2018

(65) Prior Publication Data
US 2018/0219253 A1     Aug. 2, 2018

(30) Foreign Application Priority Data

Feb. 2, 2017   (JP) ................. 2017-017581

(51) Int. Cl.
H01B 1/08       (2006.01)
H01M 6/00       (2006.01)
(Continued)

(52) U.S. Cl.
CPC ...... H01M 10/0562 (2013.01); C01G 33/006 (2013.01); C04B 35/486 (2013.01);
(Continued)

(58) Field of Classification Search
CPC .. H01B 1/00; H01B 1/08; H01M 6/18; H01M 6/185; H01M 6/188
See application file for complete search history.

(56) References Cited

U.S. PATENT DOCUMENTS 8,986,895 B2    3/2015 Ohta et al.
9,362,546 B1 *  6/2016 Donnelly .......... C04B 35/62218
(Continued)

FOREIGN PATENT DOCUMENTS

CN    103403946 A    11/2013
EP    3 252 024 A1   12/2017
(Continued)

OTHER PUBLICATIONS

Kihara et al "Effect of simultaneous substitution of alkali earth metals and Nb in Li7La3Zr2O12 on lithium-ion conducivity", ECS Electrochemistry Letters, 2 (7) A56-A59 (2013).*
(Continued)

Primary Examiner — Mark Kopec
(74) Attorney, Agent, or Firm — Oliff PLC (57) ABSTRACT

A method for producing a garnet type oxide solid electrolyte that is inhibited from a reaction of a flux and a crucible in heating and from a contamination with a crucible component produced by the reaction. The method for producing a garnet type oxide solid electrolyte represented by a general formula $(Li_{a1}, A_{a2})La_{3-b}E_bZr_{2-c}M_cO_{12}$ may comprise the steps of: preparing raw materials for the garnet type oxide solid electrolyte at a stoichiometric ratio of the above general formula; preparing flux raw materials by using NaCl and KCl at a molar ratio of NaCl:KCl=x:(1−x) where x satisfies $0 \leq x \leq 1$; mixing the solid electrolyte raw materials prepared in the above step and the flux raw materials prepared in the above step; and heating a mixture of the solid electrolyte raw materials and the flux raw materials at a temperature of less than 1100° C.

6 Claims, 6 Drawing Sheets

(51) Int. Cl.
| | |
|---|---|
| *H01M 10/0562* | (2010.01) |
| *C01G 33/00* | (2006.01) |
| *C04B 35/486* | (2006.01) |
| *C04B 35/653* | (2006.01) |
| *H01M 6/18* | (2006.01) |
| *H01M 10/0525* | (2010.01) |

(52) U.S. Cl.
CPC ............ *C04B 35/653* (2013.01); *H01B 1/08* (2013.01); *H01M 6/18* (2013.01); *C01P 2002/30* (2013.01); *C01P 2002/72* (2013.01); *C01P 2004/61* (2013.01); *C01P 2006/40* (2013.01); *C04B 2235/3203* (2013.01); *C04B 2235/3208* (2013.01); *C04B 2235/3213* (2013.01); *C04B 2235/3217* (2013.01); *C04B 2235/3227* (2013.01); *C04B 2235/3251* (2013.01); *C04B 2235/3286* (2013.01); *C04B 2235/444* (2013.01); *C04B 2235/6567* (2013.01); *C04B 2235/72* (2013.01); *C04B 2235/764* (2013.01); *H01M 10/0525* (2013.01); *H01M 2300/0071* (2013.01)

(56) References Cited

U.S. PATENT DOCUMENTS

| | | |
|---|---|---|
| 9,531,036 B2 | 12/2016 | Ohta et al. |
| 2011/0244337 A1 | 10/2011 | Ohta et al. |
| 2013/0323604 A1 | 12/2013 | Teshima et al. |
| 2014/0162113 A1 | 6/2014 | Ohta et al. |
| 2014/0227614 A1 | 8/2014 | Lee et al. |
| 2015/0056519 A1 | 2/2015 | Ohta et al. |
| 2017/0346092 A1 | 11/2017 | Yada et al. |
| 2018/0175446 A1 | 6/2018 | Nishizaki et al. |
| 2018/0248201 A1 | 8/2018 | Shimoda et al. |
| 2019/0074543 A1 | 3/2019 | Houjyou et al. |
| 2019/0088993 A1 | 3/2019 | Ohta |
| 2019/0207248 A1 | 7/2019 | Ohta |
| 2019/0207249 A1 | 7/2019 | Nakanishi et al. |
| 2019/0207250 A1 | 7/2019 | Nakanishi et al. |

FOREIGN PATENT DOCUMENTS

| | | |
|---|---|---|
| EP | 3 410 529 A1 | 12/2018 |
| JP | 2012-096940 A | 5/2012 |
| JP | 2012-174659 A | 9/2012 |
| JP | 2013-037992 A | 2/2013 |
| JP | 2013-219017 A | 10/2013 |
| JP | 2017-033801 A | 2/2017 |
| JP | 2017-216222 A | 12/2017 |
| KR | 10-2016-0065133 A | 6/2016 |
| WO | 2012/114193 A1 | 8/2012 |
| WO | 2015/054320 A2 | 4/2015 |
| WO | 2017/018217 A1 | 2/2017 |
| WO | 2017/130622 A1 | 8/2017 |

OTHER PUBLICATIONS

Mizuno et al.; "Environmentally Friendly Flux Growth of High-Quality, Idiomorphic $Li_5La_3Nb_2O_{12}$ Crystals;" Crystal Grown & Design; 2013; 13; pp. 479-484.

Oct. 18, 2019 Office Action issued in U.S. Appl. No. 16/126,137.

Yow, Z.F., et al., "Effect of $Li^+/H^+$ exchange in water treated Ta-doped $Li_7La_3Zr_2O_{12}$," Solid State Ionics, vol. 292, pp. 122-129, 2016.

Awaka, J. et al., "Single Crystal Synthesis of Cubic Garnet Related-type $Li_7La_3Zr_2O_{12}$ by a Self-Flux Method," Key Engineering Materials, vol. 485, pp. 99-102, Jul. 2011.

Awaka, J. et al., "Synthesis and structure analysis of tetragonal $Li_7La_3Zr_2O_{12}$ with the garnet-related type structure," Journal of Solid State Chemistry, vol. 182, pp. 2046-2052, Aug. 2009.

Roof, I. et al., "Crystal growth of a series of lithium garnets $Ln_3Li_5Ta_2O_{12}$ (Ln=La, Pr, Nd): Structural properties, Alexandrite effect and unusual ionic conductivity," Journal of Solid State Chemistry, vol. 182, pp. 295-300, Feb. 2009.

Apr. 24, 2020 Office Action issued in U.S. Appl. No. 16/126,137.

\* cited by examiner

METHOD FOR PRODUCING GARNET TYPE OXIDE SOLID ELECTROLYTE

TECHNICAL FIELD

The disclosure relates to a method for producing a garnet type oxide solid electrolyte.

BACKGROUND

A garnet type oxide solid electrolyte with properties such as high Li ion conductivity, has attracted attention as a solid electrolyte for an all-solid-state lithium secondary battery. A technique of producing such a garnet type oxide solid electrolyte by a flux method is known, in which materials for the solid electrolyte and a flux are mixed and heated.

In Patent Literature 1, it is described that a garnet type solid electrolyte can be obtained by using a flux (e.g., LiOH) and an auxiliary flux (e.g., NaCl, KCl) and heating them in combination with solid electrolyte raw materials. In Comparative Example 1 in Patent Literature 1, it is described that a product synthesized to be a garnet type oxide solid electrolyte represented by the composition formula $Li_7La_3Zr_2O_{12}$ by using only NaCl as a flux, shows poor growth in crystal plane and an impurity phase is present therein.

Non-Patent Literature 1 describes a method for producing a garnet type oxide solid electrolyte represented by the composition formula $Li_5La_3Nb_2O_{12}$ by using LiOH as a flux. Non-Patent Literature 1 also describes that a product synthesized to be the garnet type oxide solid electrolyte represented by the composition formula $Li_5La_3Nb_2O_{12}$ by using NaCl as the flux, shows poor growth in crystal plane and contains impurities.

Patent Literature 1: Japanese Patent Application Laid-Open No. 2012-174659
Non-Patent Literature 1: Mizuno, Y. et al., Crystal Growth and Design, 2013, 13, 479-484

However, in the case where a garnet type oxide solid electrolyte is synthesized by using a Li-containing compound (e.g., LiOH) as a flux, there is the following problem, for example: Li, which is a most base metal element and is highly reactive, reacts with a crucible component, and impurities including a crucible-derived component are produced by the reaction, along with the target garnet type oxide solid electrolyte.

SUMMARY

The disclosed embodiments were achieved in light of the above circumstance. An object of the disclosed embodiments is to provide a method for producing a garnet type oxide solid electrolyte that is inhibited from a reaction of a flux and a crucible in a heating step and from a contamination of the garnet type oxide solid electrolyte with a crucible component produced in a mixture by the reaction.

In a first embodiment, there is provided a method for producing a garnet type oxide solid electrolyte represented by a general formula $(Li_{a1},A_{a2})La_{3-b}E_bZr_{2-c}M_cO_{12}$ where a1 satisfies $5<a1<7$; a2 satisfies $0 \le a2 \le 0.2$; b satisfies $0 \le b \le 1$; c satisfies $0.125 \le c \le 0.6$; A is at least one element selected from Al and Ga; E is at least one element selected from Ca and Sr; and M is at least one element selected from Nb and Ta, the method comprising the steps of: preparing raw materials for the garnet type oxide solid electrolyte at a stoichiometric ratio of the above general formula; preparing flux raw materials by using NaCl and KCl at a molar ratio of NaCl:KCl=x:(1−x) where x satisfies $0 \le x \le 1$; mixing the solid electrolyte raw materials prepared in the above step and the flux raw materials prepared in the above step; and heating a mixture of the solid electrolyte raw materials and the flux raw materials at a temperature of less than 1100° C.

In the method for producing the garnet type oxide solid electrolyte, x may satisfy $0 \le x < 1$.

In the method for producing the garnet type oxide solid electrolyte, x may satisfy $0.1 \le x \le 0.8$.

In the method for producing the garnet type oxide solid electrolyte, the solid electrolyte raw materials and the flux raw materials may be mixed so that a theoretical value of a molar concentration of the solid electrolyte in the dissolved mixture after synthesis, is 2.5 mol/L or less in the heating step.

According to the disclosed embodiments, a method for producing a garnet type oxide solid electrolyte that is inhibited from a reaction of a flux and a crucible in a heating step and from a contamination of a target compound with a crucible component produced in the mixture by the reaction, can be provided.

BRIEF DESCRIPTION OF THE DRAWINGS

In the accompanying drawings.

DETAILED DESCRIPTION

The method for producing the garnet type oxide solid electrolyte according to the disclosed embodiments, is a method for producing a garnet type oxide solid electrolyte represented by a general formula $(Li_{a1}, A_{a2})La_{3-b}E_b Zr_{2-c}M_cO_{12}$ where a1 satisfies 5<a1<7; a2 satisfies 0≤a2≤0.2; b satisfies 0≤b≤1; c satisfies 0.125≤c≤0.6; A is at least one element selected from Al and Ga; E is at least one element selected from Ca and Sr; and M is at least one element selected from Nb and Ta, the method comprising the steps of: preparing raw materials for the garnet type oxide solid electrolyte at a stoichiometric ratio of the above general formula; preparing flux raw materials by using NaCl and KCl at a molar ratio of NaCl:KCl=x:(1−x) where x satisfies 0≤x≤1; mixing the solid electrolyte raw materials prepared in the above step and the flux raw materials prepared in the above step; and heating a mixture of the solid electrolyte raw materials and the flux raw materials at a temperature of less than 1100° C.

In the production method according to the disclosed embodiments, the garnet type oxide solid electrolyte (hereinafter it may be simply referred to as "solid electrolyte") is produced by a flux method. The flux method is a method for growing crystals of a crystalline compound, and it is a method for obtaining a crystalline compound by mixing raw materials that will be a crystalline component, and a flux that can dissolve the raw materials and the target crystalline compound at a temperature equal to or lower than the melting points of the raw materials and the target crystalline compound.

In the case of producing a solid electrolyte by using a Li-containing compound as a flux, the Li may react with a crucible component during heating, and the crucible component may be dissolved in the mixture. Therefore, the following problems arise.

First, the dissolved crucible component may be substituted with Li ions in the solid electrolyte and may decrease the Li ion conductivity of the solid electrolyte thus obtained.

Second, impurities may be produced by the dissolved crucible component and may decrease the Li ion conductivity of the solid electrolyte thus obtained.

Third, since the Li-containing compound (flux) reacts with the crucible component during heating, the flux, which is intrinsically soluble in water and easy to remove, may be less likely to dissolve in water and may make the removal of the solid electrolyte difficult.

In the case of using LiOH as the flux, there is a problem in that an aqueous solution produced by the removal of the LiOH, is a strong alkaline solution and puts a high load on the environment.

Since NaCl and KCl are less reactive than the Li-containing compound, even if they are used as the flux, they hardly react with the crucible component during heating. An aqueous solution of NaCl and KCl, which is an effluent produced by the removal of the flux, is a neutral solution and puts a small load on the environment.

However, as shown in the above-listed patent literatures, it has been impossible to synthesize a highly-crystalline garnet type oxide solid electrolyte with less impurities, when the flux is changed from the Li-containing compound to NaCl and/or KCl.

In the production method according to the disclosed embodiments, the composition of the target solid electrolyte is limited to the specific composition, whereby a highly-crystalline, high-quality garnet type oxide solid electrolyte with less impurities can be obtained even in the case of using any of NaCl, KCl and a mixture thereof as the flux.

Hereinafter, the steps of the method for producing the garnet type oxide solid electrolyte according to the disclosed embodiments, will be described in detail.

[The Composition of the Target Garnet Type Oxide Solid Electrolyte]

In the production method according to the disclosed embodiments, the composition of the target solid electrolyte is limited to the composition represented by the general formula $(Li_{a1}, A_{a2})La_{3-b}E_b Zr_{2-c}M_cO_{12}$. In the general formula, a1, a2, b and c satisfy 5<a1<7, 0≤a2≤0.2, 0≤b≤1 and 0.125≤c≤0.6, respectively. In the general formula, A is at least one element selected from Al and Ga; E is at least one element selected from Ca and Sr; and M is at least one element selected from Nb and Ta (hereinafter, the general formula satisfying these conditions may be simply referred to as the "general formula according to the disclosed embodiments".

In the disclosed embodiments, the solid electrolyte means a solid electrolyte with Li ion conductivity.

In the production method according to the disclosed embodiments, the solid electrolyte (synthesis target) is limited to the compound represented by the general formula according to the disclosed embodiments, whereby a high-quality garnet type oxide solid electrolyte can be obtained even in the case of using NaCl and/or KCl, which cannot be used in conventional production methods, as the flux.

As just described, the reason why a high-quality garnet type oxide solid electrolyte can be obtained by, even in the case of using NaCl and/or KCl the flux in the production method according to the disclosed embodiments, limiting the target solid electrolyte to the solid electrolyte represented by the general formula according to the disclosed embodiments, can be explained by a relationship with the Li ion conductivity of the thus-obtained garnet type oxide solid electrolyte.

It was found that the reason why a high-quality garnet type oxide solid electrolyte cannot be synthesized in the condition of Patent Literature 1 or Non-Patent Literature 1, in both which NaCl is used as the flux, is as follows: NaCl has a melting point that is about 350° C. higher than LiOH, the use of NaCl as the flux results in an insufficient reaction temperature and fails to promote a synthesis reaction.

In the case of using a flux with a high melting point, as a means to promote the synthesis reaction, it is common to increase the synthesis temperature or extend the reaction time.

However, in a reaction system where Li is present, Li is evaporated when the reaction system is heated at 1100° C. or more. Therefore, in the case of using NaCl and/or KCl as the flux, it is impossible to promote the reaction by setting the synthesis temperature higher than the evaporation temperature of Li.

In the case of producing the solid electrolyte by the flux method, it is known that the synthesis reaction speed is associated with the Li ion diffusion rate in the solid electrolyte thus obtained.

Figure 12:
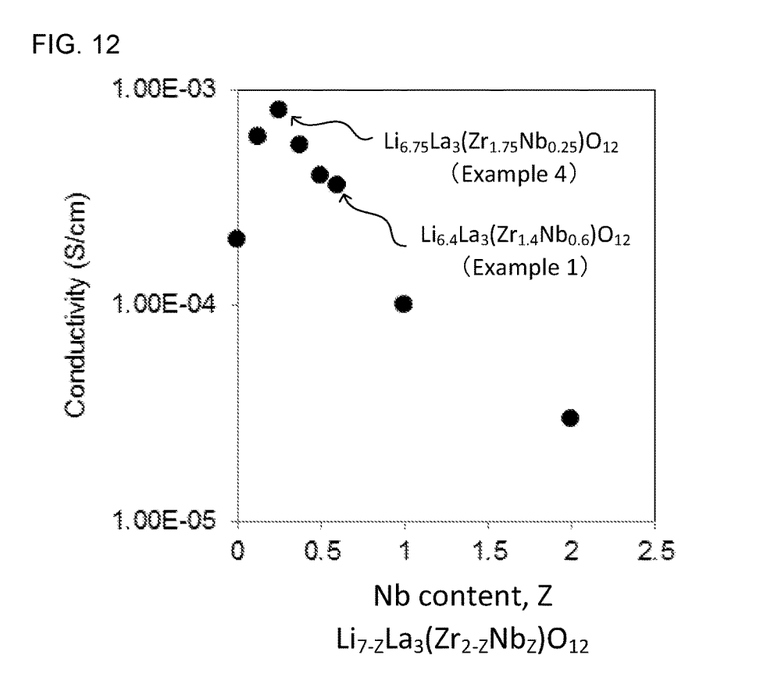
FIG. 12 is a graph showing a relationship between the composition and Li ion conductivity of garnet type oxide solid electrolytes.

FIG. 12 shows a relationship between Z in the crystals of a garnet type oxide solid electrolyte represented by the composition formula $Li_{7-z}La_3(Zr_{2-z}Nb_z)O_{12}$ and Li ion conductivity. As shown in FIG. 12, for the crystals of the garnet type oxide solid electrolyte represented by the composition formula $Li_{7-z}La_3(Zr_{2-z}Nb_z)O_{12}$, it is clear that the Li ion conductivity is high when Z satisfies 0.125≤Z≤0.6, and the Li ion conductivity is higher than the solid electrolyte represented by the composition formula $Li_7La_3Zr_2O_{12}$ (Z=0), which was tried to be synthesized in Comparative Example 1 in Patent Literature 1, and then the solid electrolyte represented by the composition formula $Li_5La_3Nb_2O_{12}$ (Z=2), which was tried to be synthesized in Non-Patent Literature 1. That is, it is clear that the Li ion diffusion rate in the solid electrolyte is high.

Therefore, if the Li ion conductivity can be increased by changing the composition of the target solid electrolyte, the synthesis reaction can be easily promoted even at low temperature; moreover, even in the case of using NaCl and/or KCl as the flux, both of which have a higher melting point than LiOH, a high-quality garnet type oxide solid electrolyte with high crystallinity can be obtained by heating at a temperature less than 1100° C., which is the evaporation temperature of Li.

Hereinafter, there will be described why, even in the case of using NaCl and/or KCl as the flux, a high-quality garnet type oxide solid electrolyte with high crystallinity is obtained by heating at a temperature of less than 1100° C., as long as the garnet type oxide solid electrolyte represented by the general formula $(Li_{a1}, A_{a2})La_{3-b}E_bZr_{2-c}M_cO_{12}$ where a1 satisfies $5<a1<7$; a2 satisfies $0 \leq a2 \leq 0.2$; b satisfies $0 \leq b \leq 1$; c satisfies $0.125 \leq c \leq 0.6$; A is at least one element selected from Al and Ga; E is at least one element selected from Ca and Sr; and M is at least one element selected from Nb and Ta, is the target.

First, as shown in FIG. 12, for the crystals of the garnet type oxide solid electrolyte represented by the composition formula $Li_{7-z}La_3(Zr_{2-z}Nb_z)O_{12}$ where Z satisfies $0.125 \leq Z \leq 0.6$, the Li ion conductivity is the lowest when Z is 0.6. Between Nb and Ta, which are used as the M element, there is no difference in the influence on the Li diffusion rate of the solid electrolyte. Therefore, it is considered that the numeral range of Z is applicable as it is as the numeral range of C in the general formula $(Li_{a1}, A_{a2}) La_{3-b}E_bZr_{2-c}M_cO_{22}$, which is a concept including $Li_{7-z}La_3(Zr_{2-z}Nb_z)O_{12}$.

In general, for the crystals of the garnet type oxide solid electrolyte represented by the composition formula of the general formula $(Li_{a1}, A_{a2})La_{3-b}E_bZr_{2-c}M_cO_{12}$, it is known that the Li ion diffusion rate is increased when a small amount of Li is substituted by the A element, i.e., by Al or Ga, and in the crystals, since a divalent element makes a larger contribution to Li ion diffusion than a trivalent element, the Li ion diffusion rate is increased when La is substituted by the E element, i.e., Ca and/or Sr.

From the above, it is considered that the garnet type oxide solid electrolyte represented by the composition formula $Li_{6.4}La_3Zr_{1.4}Nb_{0.6}O_{12}$ is the lowest in Li ion conductivity among solid electrolytes represented by the general formula $(Li_{a1}, A_{a2})La_{3-b}E_bZr_{2-c}M_cO_{12}$.

In the below-described Example 1, it was proved that a high-quality garnet type oxide solid electrolyte with high crystallinity is obtained when the garnet type oxide solid electrolyte represented by the composition formula $Li_{6.4}La_3Zr_{1.4}Nb_{0.6}O_{12}$ uses only NaCl as the flux, and the mixture of the solid electrolyte raw materials and the flux raw materials is heated at 1000° C. In Comparative Example in Patent Literature 1, it is described that a high-quality garnet type oxide solid electrolyte with high crystallinity cannot be obtained when, as described above, a solid electrolyte represented by $Li_7La_3Zr_2O_{12}$ (where C=0, that is, C is less than 0.125) uses NaCl as the flux. Moreover, in Non-Patent Literature 1, it is described that a high-quality garnet type oxide solid electrolyte with high crystallinity cannot be obtained when, as described above, a solid electrolyte represented by the composition formula $Li_5La_3Nb_2O_{12}$ (where C=2.0, that is, C is more than 0.6) uses NaCl as the flux.

Therefore, it is considered that a high-quality garnet type oxide solid electrolyte with high crystallinity is obtained by limiting the synthesis target compound to the garnet type oxide solid electrolyte represented by the general formula $(Li_{a1}, A_{a2})La_{3-b}E_bZr_{2-c}M_cO_{12}$ according to the disclosed embodiments and then heating the mixture of the solid electrolyte raw materials and the flux raw materials at less than 1100° C.

For the garnet type oxide solid electrolyte aimed at being synthesized by the production method according to the disclosed embodiments, the Li ion diffusion rate has a close relationship with the concentration of Li ions in the volume of the crystal lattice and the volume of the crystal lattice, and the relationship is needed to be optimized. Therefore, a1 is more than 5.00 and less than 7.00, and it may be in a range of from 5.8 to 6.75. Similarly, a2 is in a range of from 0 to 0.2; b is in a range of from 0 to 1; and c is in a range of from 0.125 to 0.6 and may be in a range of from 0.125 to 0.375.

In general, for the garnet type oxide solid electrolyte, as the synthesis temperature increases, the particles thus obtained increase in size and makes it difficult to control the particle diameter. Therefore, among solid electrolytes represented by the general formula according to the disclosed embodiments, $Li_{6.39}Ga_{0.12}La_3Zr_{1.75}Nb_{0.25}O_{12}$, $Li_{6.75}La_3Zr_{1.75}Nb_{0.25}O_{12}$, and $Li_{6.15}Al_{0.2}Zr_{1.75}Nb_{0.25}O_{12}$ are preferred as the target composition, which are solid electrolytes that the heating temperature can be set to a low temperature (the Li ion diffusion rate is high).

[The Step of Preparing Raw Materials for the Garnet Type Oxide Solid Electrolyte]

In the production method according to the disclosed embodiments, raw materials for the garnet type oxide solid electrolyte are weighed out and prepared at the stoichiometric ratio of the general formula according to the disclosed embodiments. The requisite amount of each raw material is calculated from the stoichiometric composition of the target solid electrolyte.

As described above, since the Li-containing compound is used as not only the solid electrolyte raw material but also the flux in the above-listed patent literatures, the Li-containing compound used is in an excessive amount that is larger than the stoichiometric ratio of the target compound.

In the production method according to the disclosed embodiments, since the lithium-containing compound is used only as a raw material for the garnet type oxide solid electrolyte, the lithium-containing compound used is not in an excessive amount that is larger than the stoichiometric ratio. Therefore, a reaction of the lithium-containing compound and a crucible in the heating step and a contamination of the target compound with the crucible component produced by the reaction, can be inhibited.

In the production method according to the disclosed embodiments, as the raw materials for the solid electrolyte, compounds containing the elements constituting the general formula according to the disclosed embodiments, i.e., the Li-containing compound, an A-containing compound (an Al-containing compound and/or a Ga-containing compound), a La-containing compound, an E-containing compound (a Ca-containing compound and/or a Sr-containing compound), a Zr-containing compound and an M-containing compound (a Nb-containing compound and/or a Ta-containing compound) can be used.

As the Li-containing compound, examples include, but are not limited to, LiOH, $LiNO_3$, $Li_2SO_4$ and $LiO_2$. Of them, LiOH can be used since it easily reacts at a relatively low temperature.

As the Al-containing compound, examples include, but are not limited to, $\gamma$-$Al_2O_3$, $\alpha$-$Al_2O_3$, $Al(NO_3)_3$ and $Al_2(SO_4)_3$. Of them, $\gamma$-$Al_2O_3$ can be used since, as with the above, it easily reacts at a relatively low temperature.

As the Ga-containing compound, examples include, but are not limited to, $Ga_2O_3$, $Ga(NO_3)_3$ and $Ga_2(SO_4)_3$. Of them, $Ga_2O_3$ can be used since, as with the above, it easily reacts at a relatively low temperature.

As the La-containing compound, examples include, but are not limited to, $La_2O_3$, $La(OH)_3$ and $La(NO_3)_3$. Of them, $La_2O_3$ can be used since, as with the above, it easily reacts at a relatively low temperature.

As the Ca-containing compound, examples include, but are not limited to, CaO, $Ca(CO_3)$ and $Ca(NO_3)_2$. Of them, CaO can be used since, as with the above, it easily reacts at a relatively low temperature.

As the Sr-containing compound, examples include, but are not limited to, SrO, $Sr(CO_3)$ and $Sr(NO_3)_2$. Of them, SrO can be used since, as with the above, it easily reacts at a relatively low temperature.

As the Zr-containing compound, examples include, but are not limited to, $ZrO_2$, $Zr(NO_3)_2$ and $Zr(SO_4)_2$. Of them, $ZrO_2$ can be used since, as with the above, it easily reacts at a relatively low temperature.

As the Nb-containing compound, examples include, but are not limited to, $Nb_2O_5$, $Nb_2O_3$ and $NbO_2$. Of them, $Nb_2O_5$ can be used since, as with the above, it easily reacts at a relatively low temperature.

As the Ta-containing compound, for example, $Ta_2O_5$ can be used.

[The Step of Preparing the Flux Raw Materials]

In the production method according to the disclosed embodiments, NaCl and KCl are used as the flux raw materials, the flux raw materials are weighed out at a molar ratio of NaCl:KCl=x:(1−x) where x satisfies 0≤x≤1.

Since NaCl and KCl are used as the flux in place of the Li-containing compound, a reaction of the flux and the crucible in the heating step and a contamination of the target compound with the crucible component produced in the mixture by the reaction, can be inhibited.

As described above, in the flux method, the crystalline compound is synthesized by mixing the solid electrolyte raw materials and the flux that can dissolve the electrolyte raw materials and the thus-obtained solid electrolyte at a temperature equal to or lower than the melting points of the electrolyte raw materials and the thus-obtained solid electrolyte, and then heating the mixture. In general, the heating temperature is determined considering the melting point of the flux and the properties of the target crystalline compound. To promote the synthesis reaction, the heating temperature is determined by adding a temperature needed depending on the properties of the target solid electrolyte to the melting point of the flux (i.e., the sum of the melting point of the flux and α° C.).

The garnet type oxide solid electrolyte that was tried to be synthesized in the above-listed patent literatures by using NaCl as the flux, has a low Li diffusion rate; therefore, in the case of using NaCl and/or KCl as the flux, which have a higher melting point than LiOH, the garnet type oxide solid electrolyte cannot be synthesized at a temperature of less than 1100° C., which is the evaporation temperature of Li.

While the melting point of NaCl is 800° C., the melting point of KCl is 775° C. Since the melting point of the mixture of KCl and NaCl can be decreased to 664° C., the heating temperature thus determined can be 30 to 150° C. lower by using KCl or the mixture of KCl and NaCl as the flux.

However, when the solid electrolyte tried to be synthesized in Patent Literature 1 and Non-Patent Literature 1 is synthesized by using NaCl as the flux, the synthesis reaction could not be promoted at a temperature of less than 1100° C., which is the evaporation temperature of Li, even in the case of using KCl (melting point 775° C.) or the mixture of KCl and NaCl (melting point 664° C.)

In the production method according to the disclosed embodiments, the target solid electrolyte is limited to the compound which has the specific composition and which has a higher Li diffusion rate than the compound tried to be produced in the above-listed patent literatures by using NaCl as the flux, whereby the synthesis reaction can be promoted even in the case of using NaCl and/or KCl as the flux, both of which have a higher melting point than LiOH.

In the production method according to the disclosed embodiments, as the flux raw material, NaCl or KCl is used solely or the mixture of NaCl and KCl is used. That is, the flux raw materials are prepared at a molar ratio of NaCl:KCl=x:(1−x) where x satisfies 0≤c≤1.

As described above, by limiting the solid electrolyte to the garnet type oxide solid electrolyte having the specific composition, the heating temperature can be determined within a upper limit temperature range in which Li does not evaporate, even in the case of using solely NaCl as the flux (x=1). However, since the melting point of NaCl is as high as 800° C., compared to the case of using KCl or the mixture of NaCl and KCl, the lower limit temperature that can be determined is high.

Also, as described above, as the heating temperature of the solid electrolyte increases, the particle diameter of the thus-obtained garnet type oxide solid electrolyte increases. Therefore, the particle diameter may be difficult to control in the case of using NaCl that the lower limit temperature at which the synthesis reaction is promoted is high and the range of the heating temperature that can be determined is narrow. As described above, the upper limit temperature is a temperature of less than 1100° C., which is the evaporation temperature of Li.

The lower limit temperature at which the synthesis reaction is promoted, can be decreased by making x satisfy 0≤x≤1 and using KCl or the mixture of NaCl and KCl as the flux, in order to decrease the melting point to lower than the case of using NaCl solely. As a result, the heating temperature range that can be determined is increased and makes it easy to control the particle diameter of the thus-obtained garnet type oxide solid electrolyte.

When x satisfies 0.1≤x≤0.8, the melting point of the mixture of NaCl and KCl can be lower than 775° C., which is the melting point of KCl. Therefore, the heating temperature range that can be determined can be further increased. Especially when x is 0.5, the melting point of the flux is 664° C., and thus the heating temperature range that can be determined is very wide.

[The Step of Mixing the Solid Electrolyte Raw Materials and the Flux Raw Materials]

In the production method according to the disclosed embodiments, the solid electrolyte raw materials prepared in the above step and the flux raw materials prepared in the above step are mixed.

As described above, when large amounts of NaCl and/or KCl are used as the main raw materials for the flux, Na and/or K ions in the flux are expected to be substituted with Li ions in the solid electrolyte.

However, in the production method according to the disclosed embodiments, contrary to the above expectation, even in the case of using large amounts of NaCl and/or KCl as the flux, the Na and/or K ions in the flux are not substituted with the Li ions in the solid electrolyte.

In the production method according to the disclosed embodiments, the mixing ratio of the solid electrolyte raw materials and the flux raw materials is not particularly limited, as long as the target solid electrolyte can be synthesized. However, if the theoretical value of the molar concentration of the solid electrolyte in the dissolved mixture after synthesis, is more than 2.5 mol/L in the heating step, the amount of the flux is too small and, for example, there is a possibility that the solute is not sufficiently dissolved or the highly-crystalline solid electrolyte is not grown.

If the concentration of the solid electrolyte in the dissolved mixture after synthesis, is less than 0.5 mol/L, the amount of the flux is too large and, for example, there is a possibility of failing to obtaining the solid electrolyte having the target composition, a possibility of small yield and poor production efficiency of the target oxide solid electrolyte, or a possibility of insufficient crystal growth.

In this step, the concentration of the solid electrolyte in the dissolved mixture after synthesis, is preferably from 0.5 to 2.5 mol/L, and more preferably from 1.0 to 2.0 mol/L.

In addition to the above-mentioned raw materials and flux raw materials, a different component may be used and mixed, as long as the structure, composition, etc., of the target oxide solid electrolyte is not affected. The amount of the different component used and mixed can be as small as possible. To obtain a high-purity garnet type oxide solid electrolyte, the raw materials can be high-purity raw materials. The purity of the raw materials is preferably 98% or more, and it can be 99% or more.

The method for mixing the solid electrolyte raw materials and the flux raw materials is not particularly limited, as long as it is a method that can uniformly mix them. As the mixing method, a known method can be used. As the known method, examples include, but are not limited to, mixing by a mortar, mixing and stirring by mechanical milling, mixing and stirring by a planetary mixer, and mixing and stirring by a shaker.

Of these mixing methods, the mechanical milling is not particularly limited, as long as it is a method of mixing the raw materials by applying mechanical energy. As the mechanical milling, examples include, but are not limited to, a ball mill, a turbo mill, mechanofusion, and a disc mill.

[The Step of Heating the Mixture of the Solid Electrolyte Raw Materials and the Flux Raw Materials]

In the production method according to the disclosed embodiments, to prevent Li from evaporation during a reaction, the mixture is heated at a temperature of less than 1100° C. As described above, by limiting the composition of the target solid electrolyte to the specific composition, a highly-crystalline, high-quality garnet type oxide solid electrolyte with less impurities can be synthesized at a temperature of less than 1100° C., even in the case of using NaCl, KCl and the mixture thereof as the flux.

The lower limit of the heating temperature is not particularly limited, as long as a solid electrolyte with high crystallinity is obtained. In general, it can be a temperature equal to or more than the melting point of the flux used. To easily control the particle diameter of the solid electrolyte, the heating temperature is preferably 960° C. or less, and more preferably 850° C. or less.

The heating time is not particularly limited, as long as a garnet type oxide solid electrolyte with high crystallinity is obtained. The heating time is preferably from 1 to 40 hours, and more preferably about 10 hours.

In the production method according to the disclosed embodiments, as an index of the crystallinity of the garnet type oxide solid electrolyte, the half-width of a peak in a XRD pattern can be used. More specifically, when the half-width of a peak in the XRD pattern of the garnet type oxide solid electrolyte is 1 or less, the crystallinity of the garnet type oxide solid electrolyte is sufficiently high. Also, the half-width of a peak in the XRD pattern can be 0.5 or less.

The heating method is not particularly limited, as long as heating in the above condition can be carried out. The heating atmosphere is not particularly limited, and heating in the air or heating in an oxygen atmosphere is preferred.

As the heating method, examples include, but are not limited to, heating by an electric furnace, heating by a heat gun, heating by a sheet heater or wire heater, heating by plasma irradiation, infrared heating, arc heating, induction heating and laser heating.

[Other Step]

After the heating step is completed, a resulting reaction mixture in the crucible and the crucible are cooled down by radiative heat loss.

In general, the flux in the reaction mixture, that is, NaCl and/or KCl are dissolved using an aqueous solution.

In the production method according to the disclosed embodiments, since LiOH is not used as the flux, a solution that puts a high load on the environment is not discharged in a flux removal step.

<The Garnet Type Oxide Solid Electrolyte Produced by the Production Method According to the Disclosed Embodiments>

Hereinafter, the garnet type oxide solid electrolyte obtained by the production method according to the disclosed embodiments, will be described.

The garnet type oxide solid electrolyte obtained by the production method according to the disclosed embodiments, has sufficiently high crystallinity. Almost all of the Li ions in the garnet type oxide solid electrolyte are not substituted with the crucible-derived component, and the garnet type oxide solid electrolyte contains almost no impurities that contain the crucible-derived component.

The garnet type oxide solid electrolyte obtained by the production method according to the disclosed embodiments, preferably has a cubic crystal structure and a lattice constant (A) in a range of from 12.30 to 12.98.

Also, the garnet type oxide solid electrolyte obtained by the production method according to the disclosed embodiments, is preferably in the form of such particles that the length of at least one side selected from height, width and depth is 0.1 μm or more and 1 mm or less.

EXAMPLES

Hereinafter, the disclosed embodiments will be described in more detail, by way of examples and comparative examples. However, the scope of the disclosed embodiments is not limited to the following examples.

<Production of Garnet Type Oxide Solid Electrolyte>

Example 1

To obtain a garnet type oxide solid electrolyte represented by the composition formula $Li_{6.4}La_3Zr_{1.4}Nb_{0.6}O_{12}$, LiOH (manufactured by Sigma-Aldrich), $La_2O_3$ (manufactured by Kojundo Chemical Laboratory Co., Ltd.), $ZrO_2$ (manufactured by Kojundo Chemical Laboratory Co., Ltd.) and $Nb_2O_5$ (manufactured by Kojundo Chemical Laboratory Co., Ltd.) were used as raw materials and weighed out at a molar ratio of 12.8:3.0:1.4:0.6.

As a flux raw material, NaCl (manufactured by Kojundo Chemical Laboratory Co., Ltd.) was used and weighed out so that the mass was 2.8 times the total mass of the solid electrolyte raw materials prepared. As just described, in the case of mixing the NaCl (flux) and the solid electrolyte raw materials so that the mass of the NaCl is 2.8 times the total mass of the solid electrolyte raw materials prepared, the concentration of the solid electrolyte in the dissolved mixture after synthesis, is 2 mol/L in the heating step.

The raw materials and the flux were subjected to dry mixing by means of a planetary ball mill (product name: P-5, manufactured by: FRITSCH).

Next, 13 g of the mixture of the raw materials and the flux was put in a 50-mL $Al_2O_3$ crucible (manufactured by Nikkato Corporation) and heated at 1000° C. for 10 hours in an electric furnace (product name: KDF, manufactured by: AS ONE Corporation).

After the mixture was cooled down to room temperature, 200 mL of 5 mol/L LiOH aqueous solution was poured into the crucible, and the flux (NaCl) was dissolved.

The thus-obtained solution containing the flux, an oxide solid electrolyte thus obtained, etc., was filtered to separate and collect a garnet type oxide solid electrolyte therefrom, thereby obtaining the garnet type oxide solid electrolyte of Example 1.

Examples 2 to 10

Garnet type oxide solid electrolytes of Examples 2 to 10 were obtained in the same manner as Example 1, except the production conditions were changed as shown in Table 1.

ratio of 140:3:2. In the case of mixing them at this ratio, LiOH equal to or larger than the stoichiometric ratio serves as the flux; therefore, the concentration of the solid electrolyte in the dissolved mixture after synthesis, is 2 mol/L in the heating step.

The components weighed out and prepared as described above, were subjected to dry mixing by means of the planetary ball mill (product name: P-5, manufactured by: FRITSCH). Next, 13 g of the mixture of the raw materials and the flux was put in a 50-mL $Al_2O_3$ crucible (manufactured by Nikkato Corporation).

The crucible containing the mixture was heated at 1000° C. for 10 hours in the electric furnace (product name: KDF, manufactured by: AS ONE Corporation).

After the mixture was cooled down to room temperature, 200 mL of distilled water was poured into the crucible, and the flux (LiOH) was dissolved.

The thus-obtained solution containing the flux and an oxide solid electrolyte thus produced was filtered to separate a garnet type oxide solid electrolyte therefrom, thereby collecting the garnet type oxide solid electrolyte of Comparative Example 1.

<X-Ray Crystal Diffraction (XRD) Measurement>

XRD spectra of the garnet type oxide solid electrolytes of Examples 1 to 10 and Comparative Example 1, were

TABLE 1

| | Target composition | Solid electrolyte raw materials | | | | | |
|---|---|---|---|---|---|---|---|
| | | Li source | A source | La source | E source | Zr source | M source |
| Example 1 | $Li_{6.4}La_3Zr_{1.4}Nb_{0.6}O_{12}$ | LiOH | — | $La_2O_3$ | — | $ZrO_2$ | $Nb_2O_5$ |
| Example 2 | $Li_{6.4}La_3Zr_{1.4}Nb_{0.6}O_{12}$ | LiOH | — | $La_2O_3$ | — | $ZrO_2$ | $Nb_2O_5$ |
| Example 3 | $Li_{6.4}La_3Zr_{1.4}Nb_{0.6}O_{12}$ | LiOH | — | $La_2O_3$ | — | $ZrO_2$ | $Nb_2O_5$ |
| Example 4 | $Li_{6.75}La_3Zr_{1.75}Nb_{0.25}O_{12}$ | LiOH | — | $La_2O_3$ | — | $ZrO_2$ | $Nb_2O_5$ |
| Example 5 | $Li_{6.75}La_3Zr_{1.75}Nb_{0.25}O_{12}$ | LiOH | — | $La_2O_3$ | — | $ZrO_2$ | $Nb_2O_5$ |
| Example 6 | $Li_{6.28}Ga_{0.04}La_3Zr_{1.4}Nb_{0.6}O_{12}$ | LiOH | $Ga_2O_3$ | $La_2O_3$ | — | $ZrO_2$ | $Nb_2O_5$ |
| Example 7 | $Li_{6.15}Ga_{0.2}La_3Zr_{1.75}Nb_{0.25}O_{12}$ | LiOH | $Ga_2O_3$ | $La_2O_3$ | — | $ZrO_2$ | $Nb_2O_5$ |
| Example 8 | $Li_{6.39}Ga_{0.12}La_3Zr_{1.75}Nb_{0.25}O_{12}$ | LiOH | $Ga_2O_3$ | $La_2O_3$ | — | $ZrO_2$ | $Nb_2O_5$ |
| Example 9 | $Li_{6.28}Al_{0.04}La_3Zr_{1.4}Nb_{0.6}O_{12}$ | LiOH | $\gamma$-$Al_2O_3$ | $La_2O_3$ | — | $ZrO_2$ | $Nb_2O_5$ |
| Example 10 | $Li_{6.15}Al_{0.2}La_3Zr_{1.75}Nb_{0.25}O_{12}$ | LiOH | $\gamma$-$Al_2O_3$ | $La_2O_3$ | — | $ZrO_2$ | $Nb_2O_5$ |
| Comparative Example 1 | $Li_7La_3Zr_2O_{12}$ | LiOH | — | $La_2O_3$ | — | $ZrO_2$ | — |

| | Flux raw material (x) | Solid electrolyte concentration (mol/L) | Heating temperature (° C.) | Heating time (h) | Particle diameter (µm) | Impurities observed by SEM |
|---|---|---|---|---|---|---|
| Example 1 | NaCl(1) | 2 | 1000 | 10 | 5.8 | No |
| Example 2 | NaCl, KCl(0.5) | 2 | 800 | 20 | 1.0 | No |
| Example 3 | NaCl(1) | 2 | 960 | 20 | 5.6 | No |
| Example 4 | NaCl(1) | 2 | 960 | 20 | 5.6 | No |
| Example 5 | NaCl(1) | 1 | 960 | 20 | 5.6 | No |
| Example 6 | NaCl(1) | 2 | 960 | 20 | 6.4 | No |
| Example 7 | NaCl(1) | 2 | 960 | 20 | 6.4 | No |
| Example 8 | NaCl(1) | 2 | 960 | 20 | 6.4 | No |
| Example 9 | NaCl(1) | 2 | 960 | 20 | 7.1 | No |
| Example 10 | NaCl(1) | 2 | 960 | 20 | 7.1 | No |
| Comparative Example 1 | LiOH | 2 | 1000 | 10 | 7.5 | Yes |

Comparative Example 1

To produce a garnet type oxide solid electrolyte represented by the composition formula $Li_7La_3Zr_2O_{12}$, LiOH (manufactured by Sigma-Aldrich), which was used as a raw material and flux, and $La_2O_3$ (manufactured by Kojundo Chemical Laboratory Co., Ltd.) and $ZrO_2$ (manufactured by Kojundo Chemical Laboratory Co., Ltd.), both of which were used as raw materials, were weighed out at a molar obtained by X-ray powder diffraction measurement with a XRD measurement device (product name: SmartLab, manufactured by: Rigaku Corporation) using a CuKα radiation. The measurement was carried out in an inert atmosphere (Ar gas) at a scanning speed of 5°/min, with a sampling width of 0.01°, and in a 2θ range from 10° to 80°.

<Electron Microscope Observation>

The garnet type oxide solid electrolytes obtained in Examples 1 to 10 and Comparative Example 1 were each placed in a sample chamber and observed by a scanning electron microscope (SEM) (product name: JSM7500, manufactured by: JEOL Ltd.) at an accelerating voltage of 15 kV and a magnification of 100× to 6000×.

<Evaluation Results>

Figure 1:
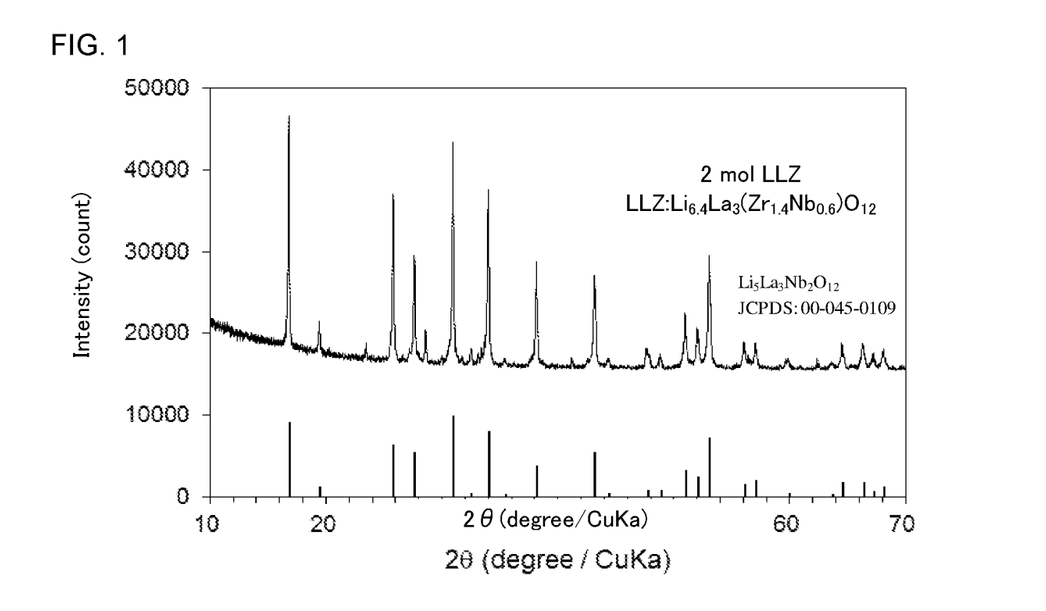
FIG. 1 shows an XRD spectrum of a garnet type oxide solid electrolyte obtained by a production method of Example 1.
Figure 2:
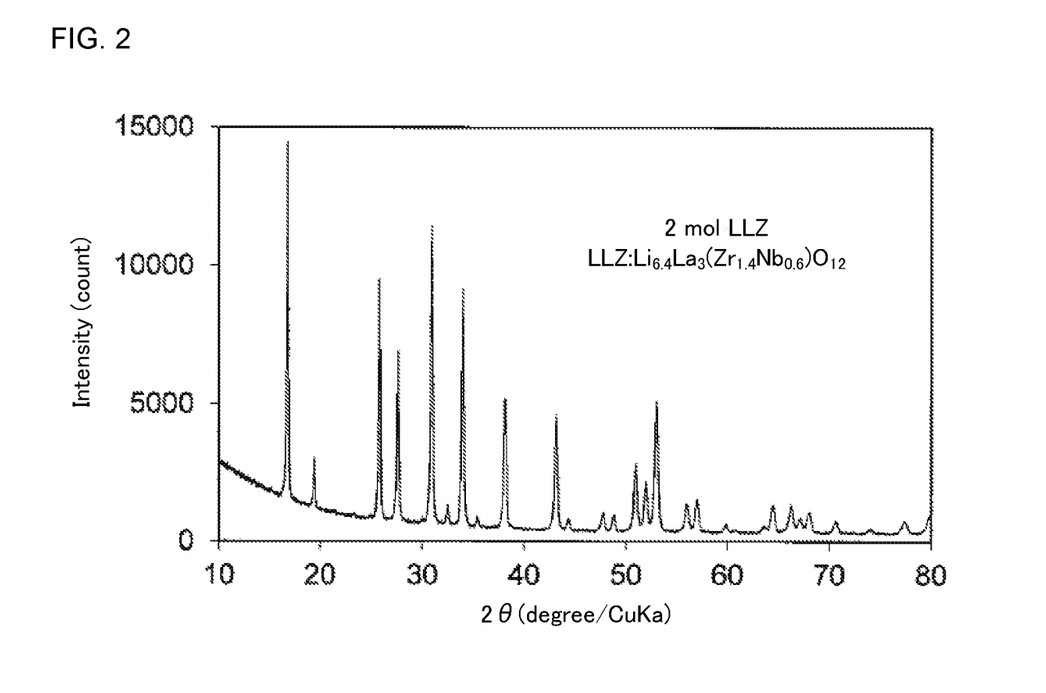
FIG. 2 shows an XRD spectrum of a garnet type oxide solid electrolyte obtained by a production method of Example 2.
Figure 3:
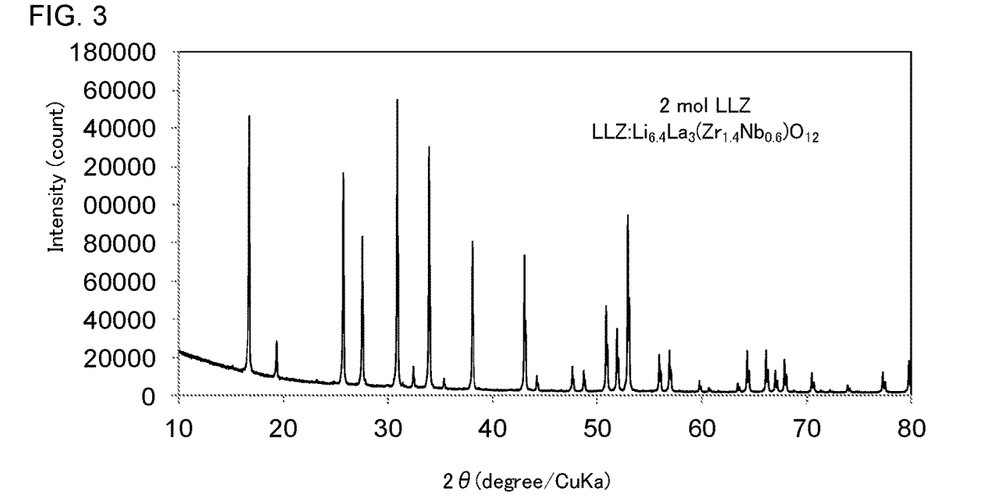
FIG. 3 shows an XRD spectrum of a garnet type oxide solid electrolyte obtained by a production method of Example 3.
Figure 4:
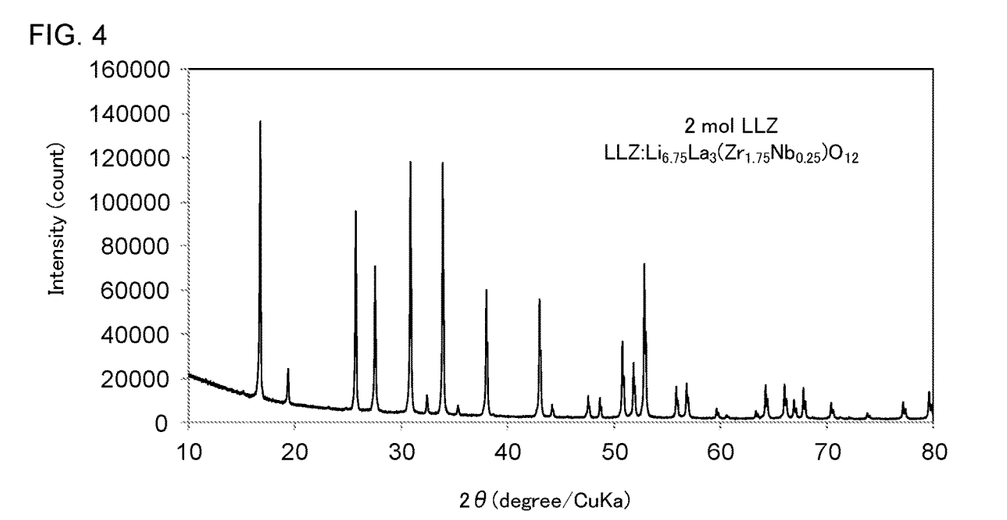
FIG. 4 shows an XRD spectrum of a garnet type oxide solid electrolyte obtained by a production method of Example 4.
Figure 5:
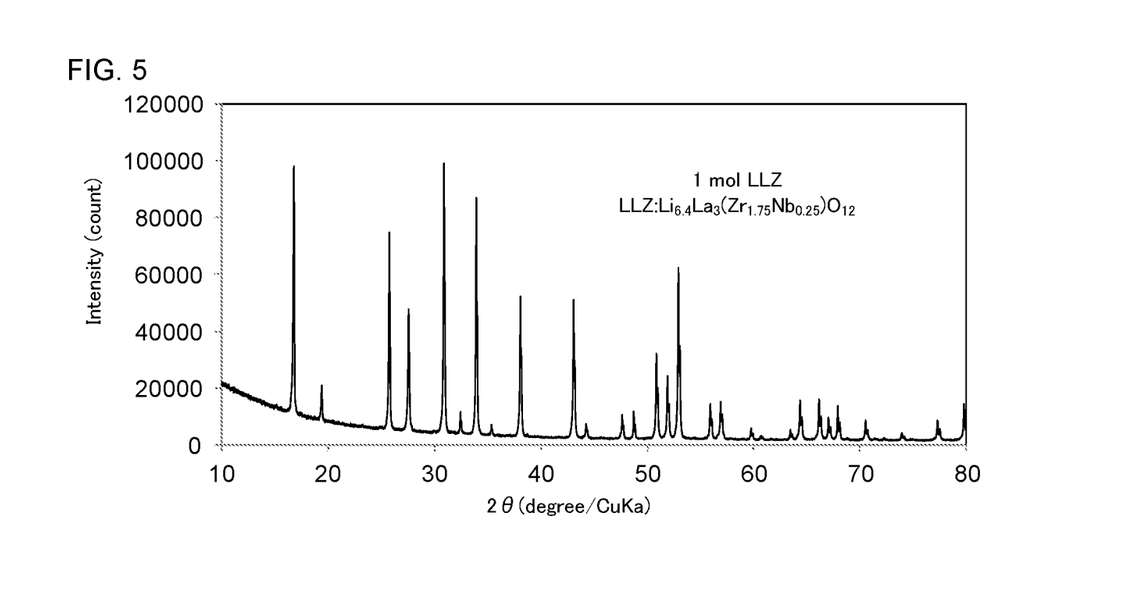
FIG. 5 shows an XRD spectrum of a garnet type oxide solid electrolyte obtained by a production method of Example 5.
Figure 6:
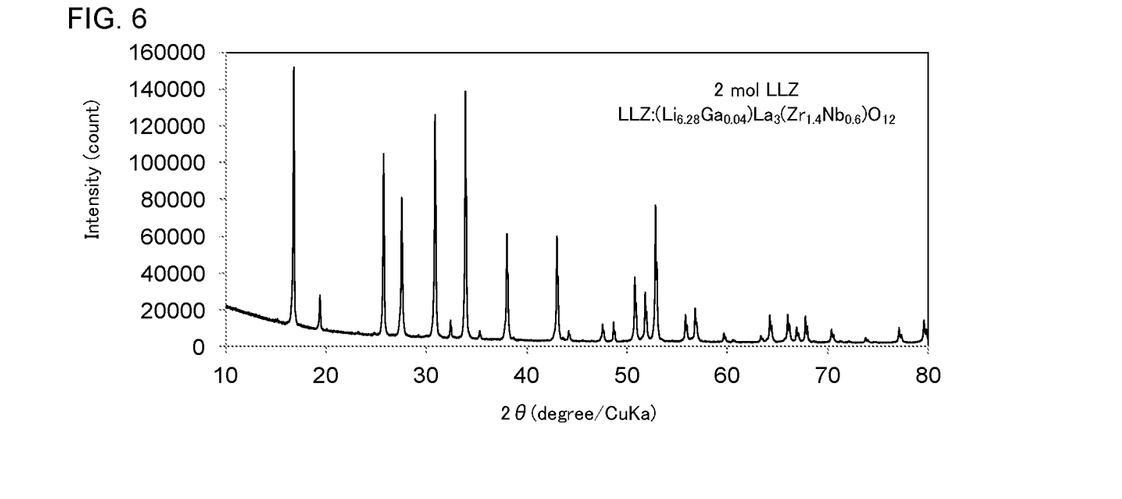
FIG. 6 shows an XRD spectrum of a garnet type oxide solid electrolyte obtained by a production method of Example 6.
Figure 7:
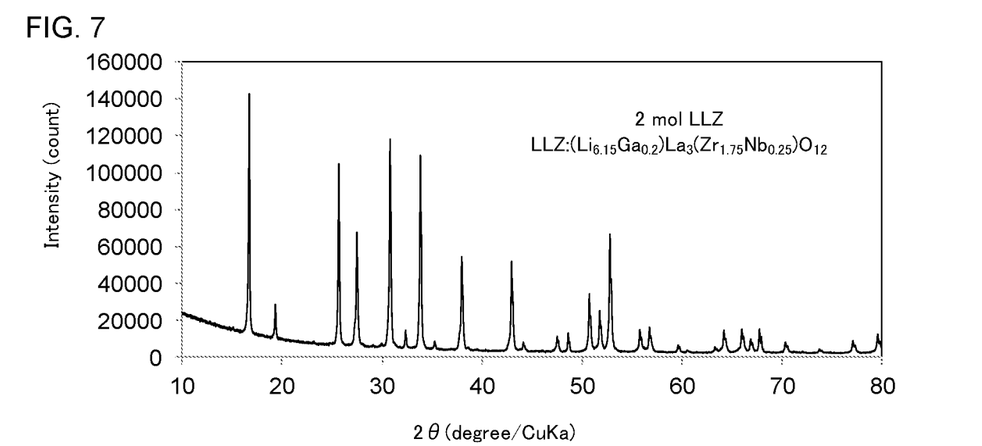
FIG. 7 shows an XRD spectrum of a garnet type oxide solid electrolyte obtained by a production method of Example 7.
Figure 8:
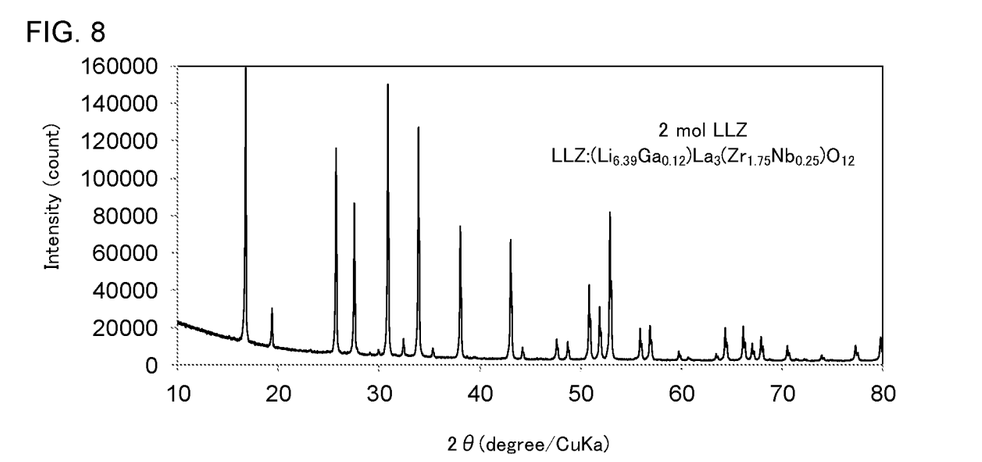
FIG. 8 shows an XRD spectrum of a garnet type oxide solid electrolyte obtained by a production method of Example 8.
Figure 9:
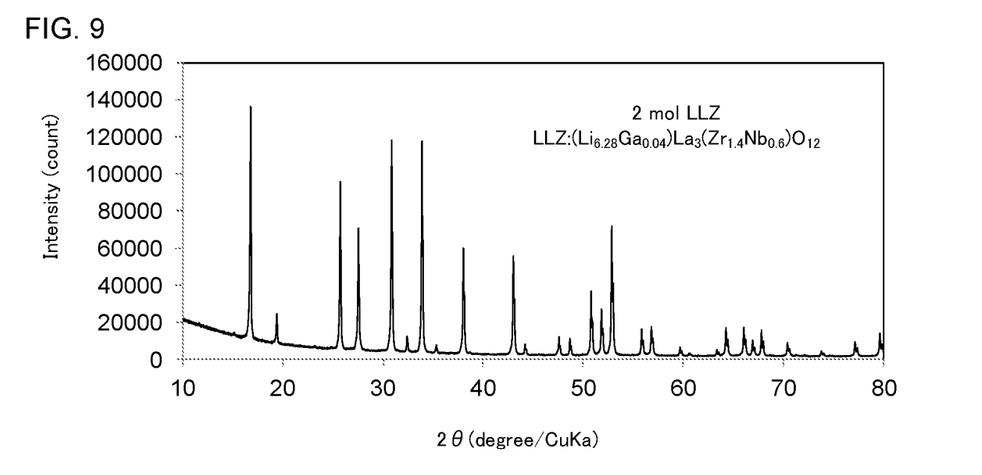
FIG. 9 shows an XRD spectrum of a garnet type oxide solid electrolyte obtained by a production method of Example 9.
Figure 10:
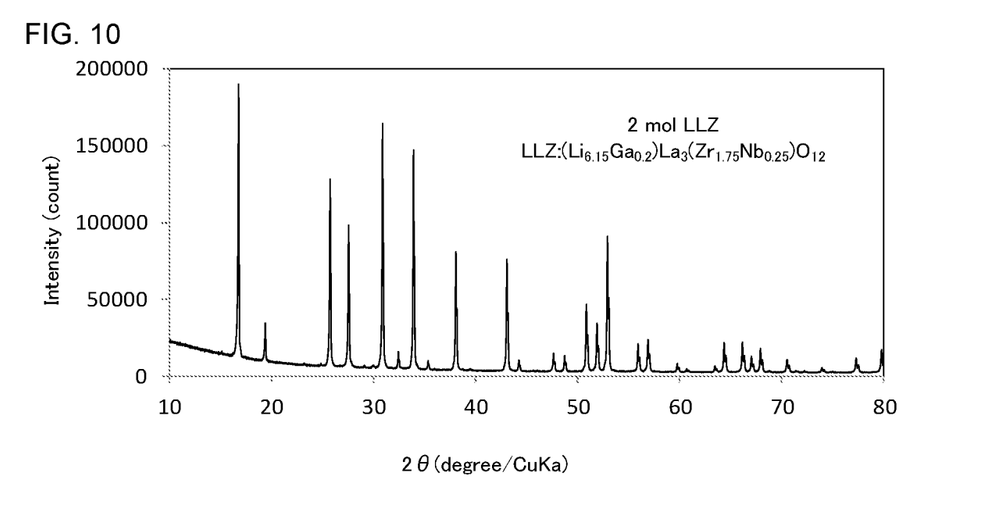
FIG. 10 shows an XRD spectrum of a garnet type oxide solid electrolyte obtained by a production method of Example 10.
Figure 11:
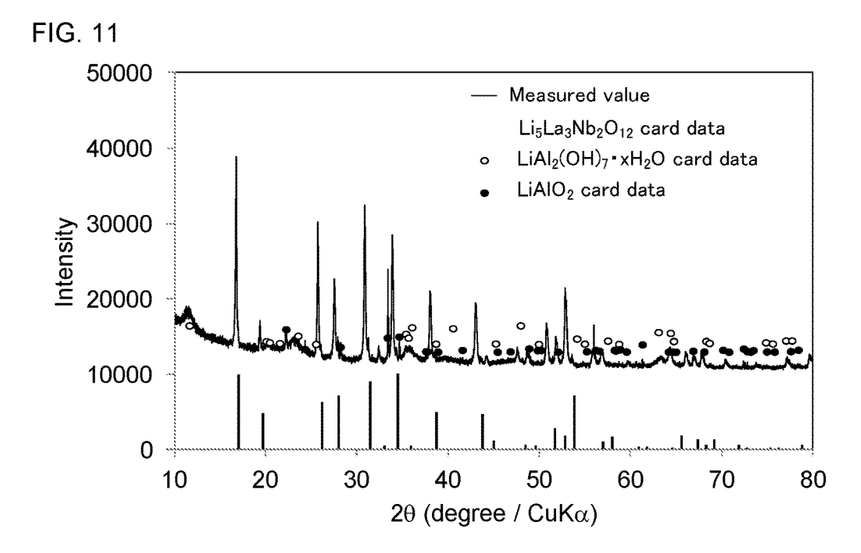
FIG. 11 shows an XRD spectrum of a garnet type oxide solid electrolyte obtained by a production method of Comparative Example 1.

FIGS. 1 to 10 show the XRD spectra of the garnet type oxide solid electrolytes of Examples 1 to 10. FIG. 11 shows the XRD spectrum of the garnet type oxide solid electrolyte of Comparative Example 1.

According to Table 1, impurities were found around the particles of the garnet type oxide solid electrolyte shown on a SEM observation image of the solid electrolyte of Comparative Example 1.

As shown in FIG. 11, in addition to a spectrum attributable to the target $Li_7La_3Zr_2O_{22}$, spectra of $LiAl_2(OH)_x$ and $LiAlO_2$ were found in the XRD spectrum of the garnet type oxide solid electrolyte of Comparative Example 1. Therefore, the impurities found on the SEM observation image of the solid electrolyte of Comparative Example 1 are considered to be $LiAl_2(OH)_x$ and $LiAlO_2$. These impurities are considered to be impurities resulting from Al ions melted in the mixture by the reaction of the flux (LiOH) and the crucible material ($Al_2O_3$).

Meanwhile, according to Table 1, only the particles of the target solid electrolyte were observed on SEM observation images of the garnet type oxide solid electrolytes of Examples 1 to 10, and the impurities observed in Comparative Example 1 were not found. Also, as shown in FIGS. 1 to 10, only a spectrum attributable to the target garnet type oxide solid electrolyte was found in the XRD spectra of the garnet type oxide solid electrolytes of Examples 1 to 10, and almost no spectra of the impurities found in Comparative Example 1, were found.

As just described, since the impurities ($LiAl_2(OH)_x$ and $LiAlO_2$) are not observed in the garnet type oxide solid electrolytes of Examples 1 to 10 produced by using NaCl and/or KCl as the flux raw materials, it is considered that the crucible component (Al) hardly eluted in the heating step.

There has been no known method for producing a garnet type oxide solid electrolyte by using NaCl and/or KCl as flux raw materials. However, in the production methods of Examples 1 to 10, the garnet type oxide solid electrolyte having such a composition that the Li ion conductivity is $2 \times 10^{-5}$ S/cm or more is synthesized as the target compound, whereby the garnet type oxide solid electrolyte can be produced even in the case of using NaCl and/or KCl as flux raw materials.

As described above, the garnet type oxide solid electrolyte represented by the general formula $(Li_{a1}, A_{a2})La_{3-b}E_bZr_{2-c}M_cO_{12}$ has higher Li ion conductivity than $Li_{6.4}La_3Zr_{1.4}Nb_{0.6}O_{12}$ (Examples 1 to 3) which is the lowest in Li ion conductivity among the solid electrolytes produced in Examples 1 to 10. Therefore, it is considered that the highly-crystalline garnet type oxide solid electrolyte can be produced by heating at a temperature of less than 1100° C., even in the case of using NaCl and/or KCl as the flux raw materials.

Also, the particle diameter of the solid electrolyte obtained in Example 2 was observed by an electron microscope. According to Table 1, the particle diameter is 1.0 μm and smaller than the particle diameter (5.8 μm) of the solid electrolyte obtained in Example 1. Therefore, it is clear that Example 2 in which NaCl and KCl were mixed in equal amounts and used as the flux raw materials, can produce the garnet type oxide solid electrolyte by heating at a temperature 200° C. lower than Example 1 in which only NaCl was used as the flux raw material (i.e., by heating at a temperature of 800° C.) and can decrease the particle diameter of the thus-obtained solid electrolyte.

From the above results, it is clear that in the method for producing the garnet type oxide solid electrolyte according to the disclosed embodiments, a garnet type oxide solid electrolyte that has high crystallinity and is inhibited from a reaction of the flux and the crucible in the heating step and from a contamination of the target compound with the crucible component produced by the reaction, is obtained by limiting the target compound to the garnet type oxide solid electrolyte having the specific composition, and by using NaCl, KCl and the mixture of NaCl and KCl as the flux.

The invention claimed is:

1. A method for producing a garnet type oxide solid electrolyte represented by a general formula $(Li_{a1}, A_{a2})La_{3-b}E_bZr_{2-c}M_cO_{12}$ where a1 satisfies 5<a1<7; a2 satisfies 0≤a2≤0.2; b satisfies 0≤b≤1; c satisfies 0.125≤c≤0.6; A is at least one element selected from Al and Ga; E is at least one element selected from Ca and Sr; and M is at least one element selected from Nb and Ta, the method comprising the steps of:
preparing raw materials for the garnet type oxide solid electrolyte at a stoichiometric ratio of the above general formula;
preparing flux raw materials by using NaCl and KCl at a molar ratio of NaCl:KCl=x:(1−x) where x satisfies 0≤x≤1;
mixing the solid electrolyte raw materials prepared in the above step and the flux raw materials prepared in the above step; and
heating a mixture of the solid electrolyte raw materials and the flux raw materials at a temperature of less than 1100° C., wherein the flux excludes a lithium-containing compound.

2. The method for producing the garnet type oxide solid electrolyte according to claim 1, wherein x satisfies 0≤x<1.

3. The method for producing the garnet type oxide solid electrolyte according to claim 2, wherein x satisfies 0.1≤x≤0.8.

4. The method for producing the garnet type oxide solid electrolyte according to claim 1, wherein the solid electrolyte raw materials and the flux raw materials are mixed so that a theoretical value of a molar concentration of the solid electrolyte in the dissolved mixture after synthesis, is 2.5 mol/L or less in the heating step.

5. The method for producing the garnet type oxide solid electrolyte according to claim 1, wherein a1 is in a range of from 5.8 to 6.75 and c is in a range of from 0.125 to 0.375.

6. The method for producing the garnet type oxide solid electrolyte according to claim 1, wherein the garnet type oxide solid electrolyte is represented by one of the following general formulae:

$Li_{6.4}La_3Zr_{1.4}Nb_{0.6}O_{12}$, $Li_{6.39}Ga_{0.12}La_3Zr_{1.75}Nb_{0.25}O_{12}$, $Li_{6.75}La_3Zr_{1.75}Nb_{0.25}O_{12}$, $Li_{6.15}Al_{0.2}Zr_{1.75}Nb_{0.25}O_{12}$, $Li_{6.15}Ga_{0.2}La_3Zr_{1.75}Nb_{0.25}O_{12}$, $Li_{6.28}Ga_{0.04}La_3Zr_{1.4}Nb_{0.6}O_{12}$, and $Li_{6.28}Al_{0.04}La_3Zr_{1.4}Nb_{0.6}O_{12}$.

* * * * *